(12) United States Patent
Finkbeiner et al.

(10) Patent No.: US 7,469,615 B2
(45) Date of Patent: Dec. 30, 2008

(54) SNAP ON LOWER BRACKET AND BEARING SUPPORT

(75) Inventors: Steven P. Finkbeiner, Essexville, MI (US); Robert D. Maida, Pinconning, MI (US)

(73) Assignee: Delphi Technologies, Inc., Troy, MI (US)

( * ) Notice: Subject to any disclaimer, the term of this patent is extended or adjusted under 35 U.S.C. 154(b) by 786 days.

(21) Appl. No.: 11/012,605

(22) Filed: Dec. 15, 2004

(65) Prior Publication Data

US 2005/0184500 A1 Aug. 25, 2005

Related U.S. Application Data

(60) Provisional application No. 60/545,815, filed on Feb. 19, 2004.

(51) Int. Cl.
B62D 1/18 (2006.01)
(52) U.S. Cl. ............... 74/493; 280/775; 280/777
(58) Field of Classification Search ............ 74/492, 74/493; 280/775, 777
See application file for complete search history.

(56) References Cited

U.S. PATENT DOCUMENTS

| | | | |
|---|---|---|---|
| 4,600,207 A | 7/1986 | Zosi | |
| 4,616,522 A | 10/1986 | White et al. | |
| 4,682,788 A | 7/1987 | Yoshimura | |
| 4,730,508 A | 3/1988 | Haldric et al. | |
| RE32,641 E | 4/1988 | Swoveland | |
| 4,773,674 A | 9/1988 | Wierschem | |
| 4,884,778 A | 12/1989 | Yamamoto | |
| 4,914,970 A | 4/1990 | Mastrofrancesco et al. | |
| 4,951,522 A | 8/1990 | Chowdhury et al. | |
| 5,127,670 A | 7/1992 | Hoblingre et al. | |
| 5,169,172 A | 12/1992 | Dolla | |
| 5,180,189 A | 1/1993 | Moreno | |
| 5,228,359 A | 7/1993 | Thomas | |
| 5,336,013 A | 8/1994 | Duffy et al. | |
| 5,358,350 A | 10/1994 | Oertle | |
| 5,470,107 A | 11/1995 | Muntener et al. | |
| 5,553,888 A | 9/1996 | Turner et al. | |
| 5,560,257 A | 10/1996 | DeBisschop et al. | |
| 5,609,063 A | 3/1997 | Hedderly et al. | |
| 5,645,299 A | 7/1997 | Dies et al. | |
| 5,673,938 A | 10/1997 | Kaliszewski | |
| 5,722,300 A * | 3/1998 | Burkhard et al. | ............... 74/493 |
| 5,743,150 A | 4/1998 | Fevre et al. | |
| 5,868,426 A | 2/1999 | Edwards et al. | |
| 6,039,502 A * | 3/2000 | Naff et al. | .................... 403/282 |

(Continued)

Primary Examiner—David M Fenstermacher
(74) Attorney, Agent, or Firm—Thomas N. Twomey

(57) ABSTRACT

The present invention provides a snap-on lower bracket (14, 14a) and bearing support for supporting a collapsible steering shaft in a vehicle. The invention includes a lower steering column jacket (12, 12b) defining a depression and a bracket (14, 14a) defining a tab that cooperates with the depression. For example, when the lower steering column jacket (12, 12b) and the support bracket (14, 14a) are engaged with respect to one another, the tab engages the depression in a snap-fit relationship. The snap-fit relationship provides sufficient strength to maintain the position of the lower steering column jacket (12, 12b) relative to the vehicle during normal vehicle handling. In the event of an impact situation, the lower steering column jacket (12, 12b) can move in response to the driver impacting the steering wheel and urge the tab out of engagement with the depression.

28 Claims, 6 Drawing Sheets

U.S. PATENT DOCUMENTS

| | | |
|---|---|---|
| 6,099,038 A | 8/2000 | Jurik et al. |
| 6,176,151 B1 | 1/2001 | Cymbal |
| 6,205,882 B1 | 3/2001 | Jolley |
| 6,264,240 B1 * | 7/2001 | Hancock ...................... 280/777 |
| 6,276,719 B1 | 8/2001 | Gartner |
| 6,279,953 B1 | 8/2001 | Cartwright |
| 6,322,103 B1 * | 11/2001 | Li et al. ...................... 280/777 |
| 6,378,934 B1 | 4/2002 | Palazzolo et al. |
| 6,382,670 B2 | 5/2002 | Badaire et al. |
| 6,450,533 B1 | 9/2002 | Kimura et al. |
| 6,453,555 B1 | 9/2002 | Kato et al. |
| 6,474,189 B1 | 11/2002 | Koellisch et al. |
| 6,540,618 B1 | 4/2003 | MacDonald et al. |
| 6,578,449 B1 | 6/2003 | Anspaugh et al. |
| 6,644,690 B2 | 11/2003 | Brownlee et al. |
| 6,655,715 B2 | 12/2003 | Anspaugh et al. |
| 6,666,772 B1 * | 12/2003 | Cheney et al. ............... 464/183 |
| 6,685,225 B2 | 2/2004 | Hancock et al. |
| 6,698,793 B2 | 3/2004 | Takano et al. |
| 6,749,222 B2 * | 6/2004 | Manwaring et al. ......... 280/777 |
| 6,799,780 B2 | 10/2004 | Anspaugh et al. |
| 7,124,866 B2 * | 10/2006 | Manwaring et al. ......... 188/374 |
| 2003/0042723 A1 * | 3/2003 | Riefe ......................... 280/777 |
| 2004/0232685 A1 * | 11/2004 | Gatti et al. .................. 280/777 |
| 2006/0033320 A1 * | 2/2006 | Finkbeiner et al. .......... 280/777 |
| 2006/0049621 A1 * | 3/2006 | Lee ............................ 280/777 |
| 2007/0039403 A1 * | 2/2007 | Manwaring et al. ........... 74/492 |

* cited by examiner

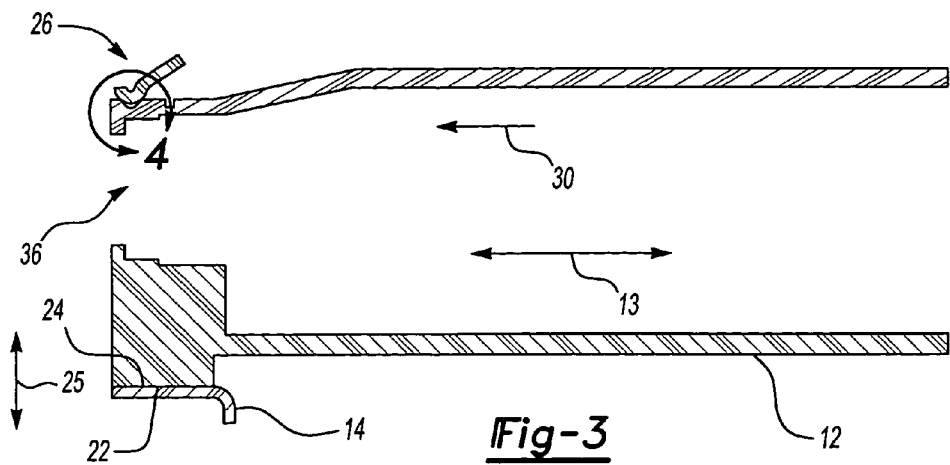
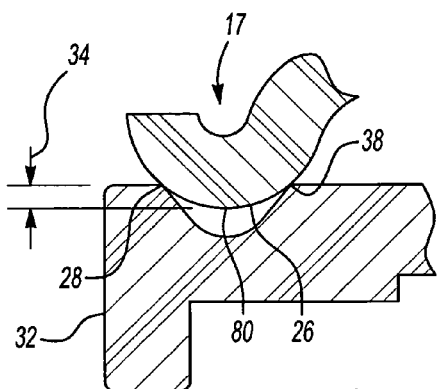
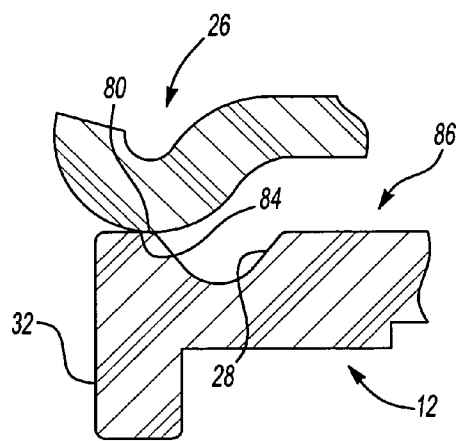
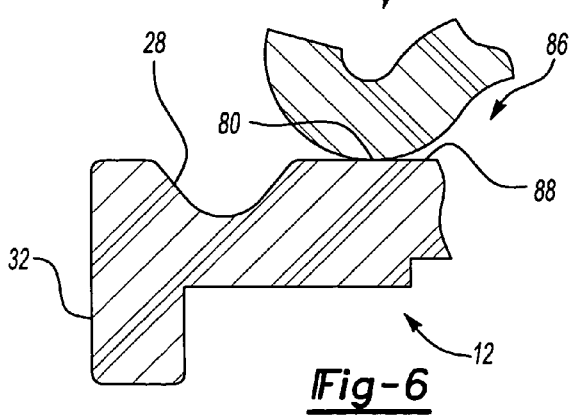

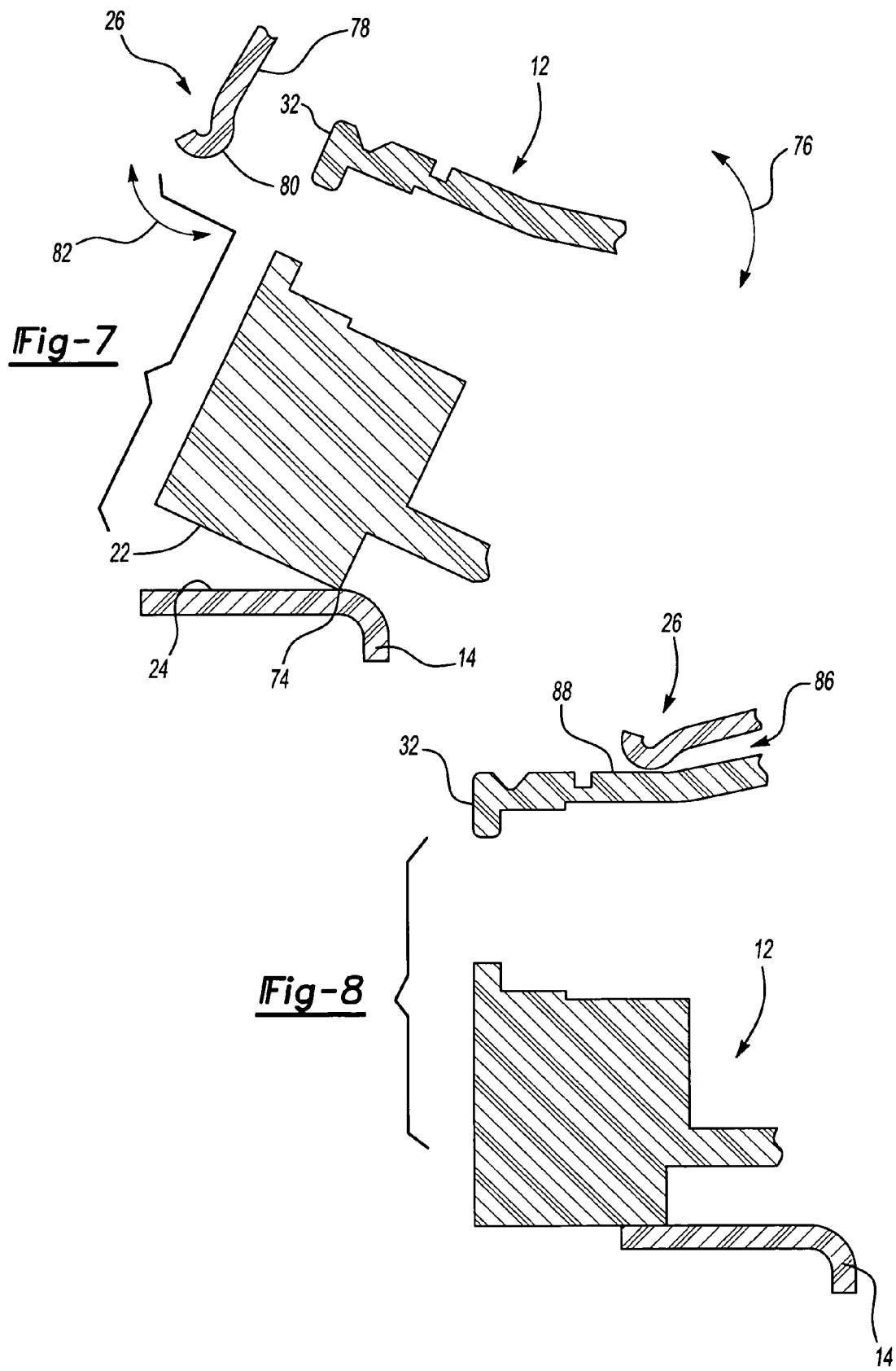

SNAP ON LOWER BRACKET AND BEARING SUPPORT

CROSS-REFERENCE TO RELATED APPLICATIONS

This application claims the benefit of U.S. provisional patent application Ser. No. 60/545,815 for a SNAP ON LOWER BRACKET AND BEARING SUPPORT, filed on Feb. 19, 2004, which is hereby incorporated by reference in its entirety. This claim is made under 35 U.S.C. § 119(e); 37 C.F.R. § 1.78; and 65 Fed. Reg. 50093.

FIELD OF THE INVENTION

The invention relates to a steering column of a vehicle, and more particularly the invention provides a structure for connecting a lower portion of the steering column to the vehicle.

BACKGROUND OF THE INVENTION

Steering columns of passenger vehicles are often secured to the vehicle structure in such a way that the column can collapse in response to impact. An impact occurs when a driver is propelled against the steering column in a severe crash event. Collapse of the steering column is controlled movement of the steering column to absorb at least some of the energy of impact.

SUMMARY OF THE INVENTION AND ADVANTAGES

The present invention provides a snap-on lower bracket and bearing support for supporting a collapsible steering shaft in a vehicle. The invention includes a lower steering column jacket defining a depression and a bracket defining a tab that cooperates with the depression. For example, when the lower steering column jacket and the support bracket are engaged with respect to one another, the tab engages the depression in a snap-fit relationship. The snap-fit relationship provides sufficient strength to maintain the position of the lower steering column jacket relative to the vehicle during normal vehicle handling. In the event of an impact situation, the lower steering column jacket can move in response to the driver impacting the steering wheel and urge the tab out of engagement with the depression.

The invention also provides a bearing support for substantially fixedly positioning a bearing. The bearing supports the steering shaft that extends through the lower steering column jacket. The invention provides a wire retainer that is insertable in a slot defined by the lower steering column jacket. The wire retainer is placed in an aft position of the bearing and prevents the bearing from releasing in an impact situation or being worked out of engagement with the lower steering column jacket during normal vehicle handling. The wire retainer can be secured in position by the bracket.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a cross-sectional view taken along section lines 3-3 of FIG. 2;

FIG. 4 is a detail view of the detail 4 shown in FIG. 3 wherein the tab is disposed in the depression;

FIG. 5 is a detail view generally similar to the view of FIG. 4 but showing the tab and depression substantially immediately prior to snapping engagement between the tab and the depression;

FIG. 6 is a detail view generally similar to the view of FIG. 4 but showing the tab and depression substantially immediately subsequent to a release of snapping engagement between the tab and the depression when the lower steering column jacket collapses with respect to the support bracket;

FIG. 7 is a cross-sectional view generally similar to the view of FIG. 3 but showing a method of assembling the lower steering column jacket and support bracket with respect to one another;

FIG. 8 is a cross-sectional view generally similar to the view of FIG. 3 but showing the lower steering column jacket moving through a window defined by the support bracket during collapse;

DETAILED DESCRIPTION OF THE PREFERRED EMBODIMENT

Figure 1:
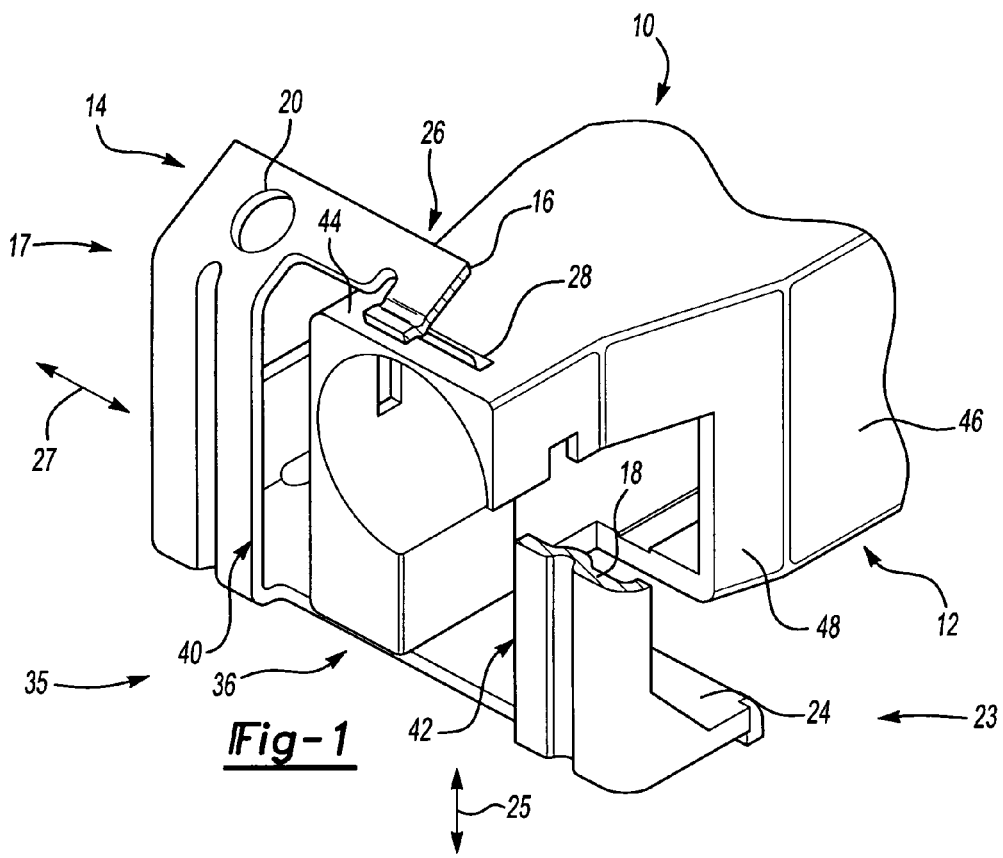
FIG. 1 is a perspective view with a cut-away portion of an embodiment of the invention including a lower steering column jacket defining a depression and a support bracket defining a tab.
Figure 2:
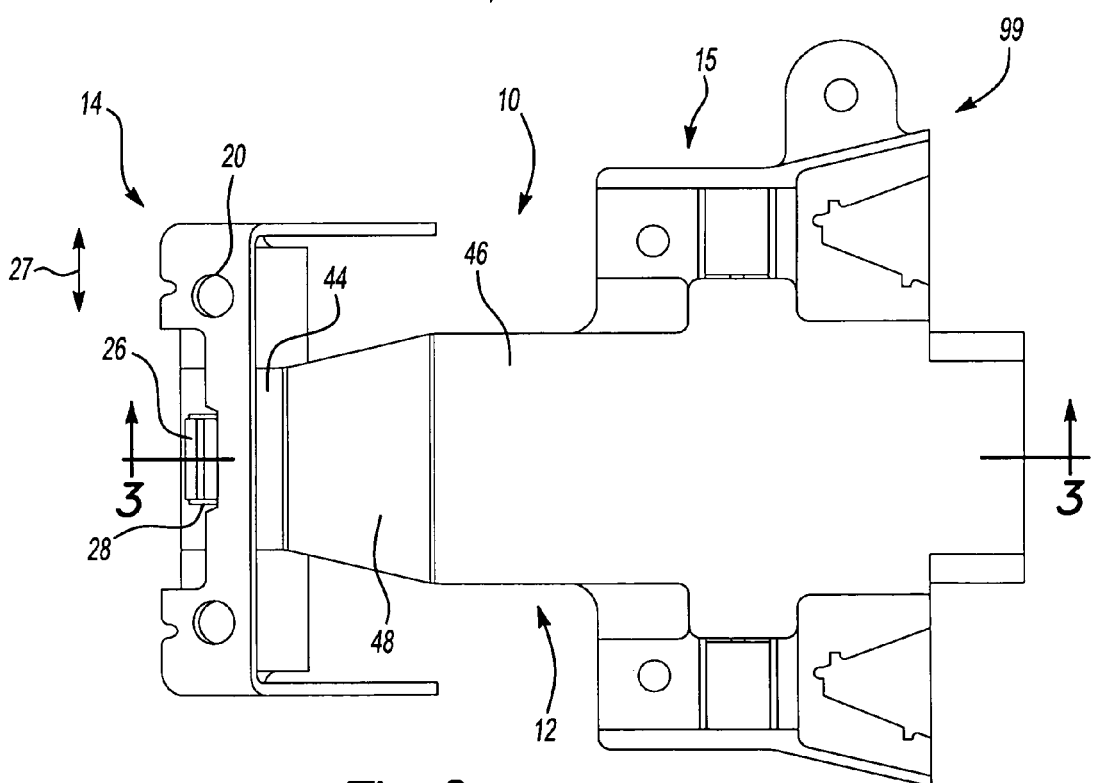
FIG. 2 is a top view of an embodiment of the invention shown in FIG. 1 and also including a second bracket spaced from the support bracket.
Figure 9:
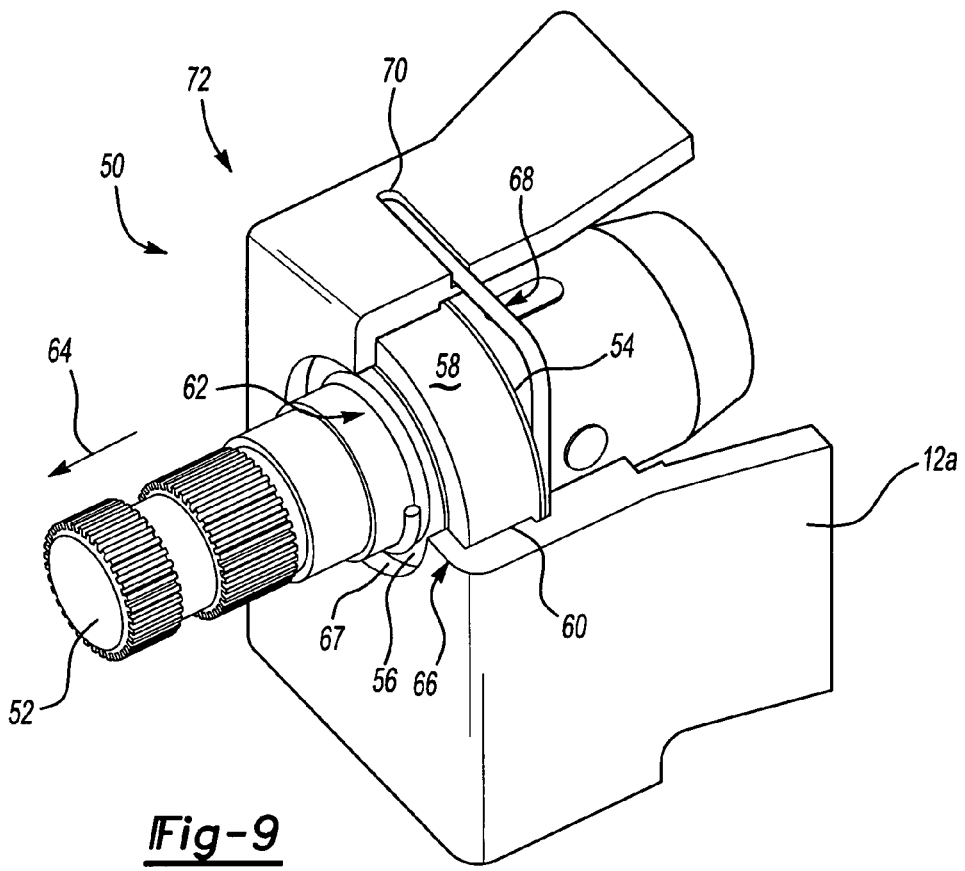
FIG. 9 is a perspective view with a cut-away portion of a bearing support according to an embodiment of the invention.
Figure 10:
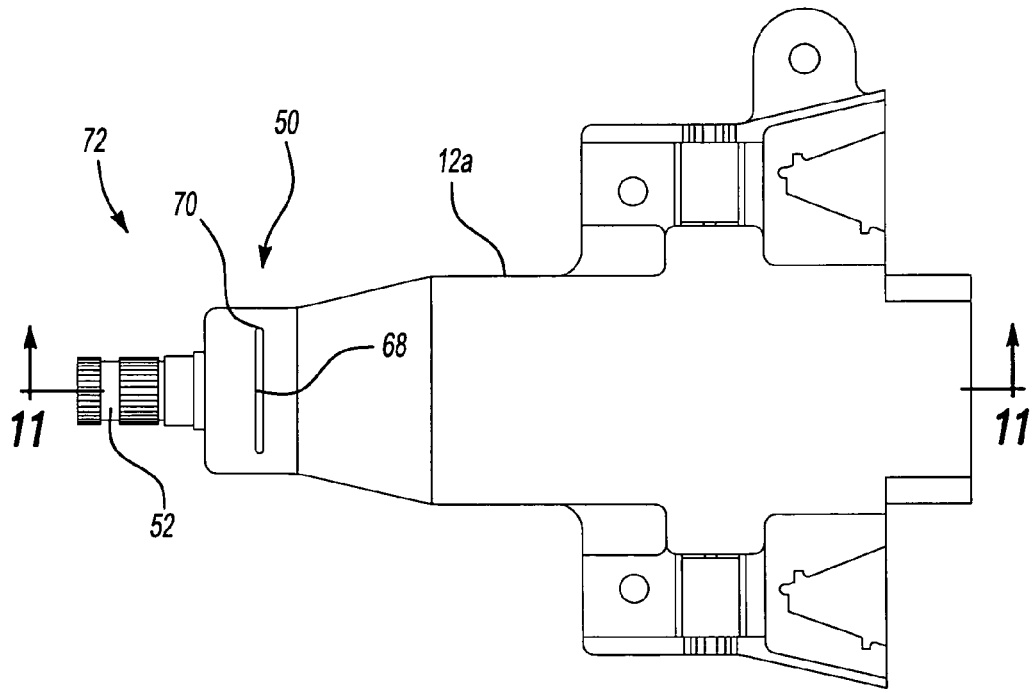
FIG. 10 is a top view of a steering column assembly including a bearing support according to a second embodiment of the invention.
Figure 11:
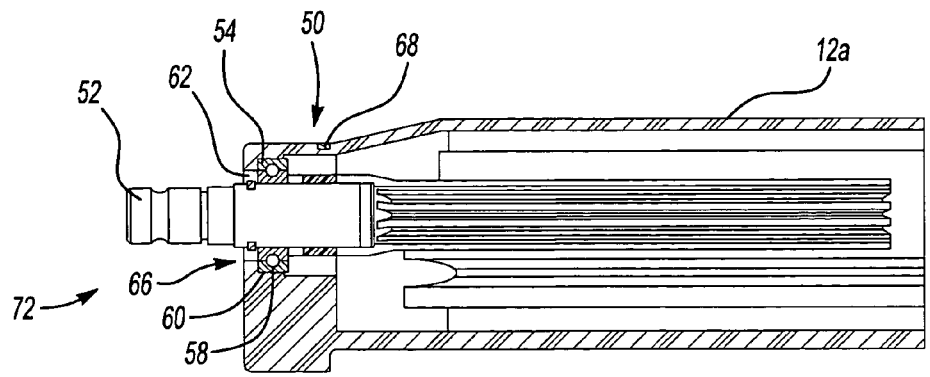
FIG. 11 is a cross-sectional view taken along section lines 11-11 in FIG. 10.
Figure 12:
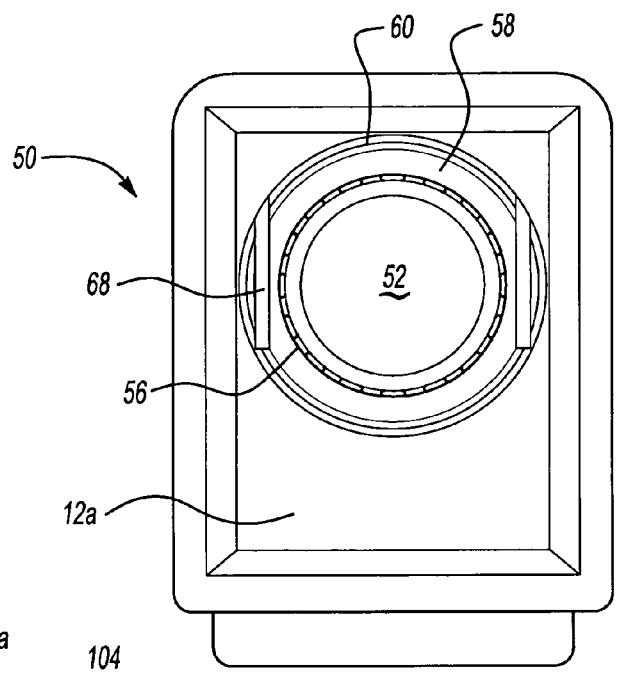
FIG. 12 is a right-side view of the embodiment of the invention shown in FIG. 9.

A plurality of different embodiments of the invention are shown in the Figures of the application. Similar features are shown in the various embodiments of the invention. Similar features have been numbered with a common reference numeral and have been differentiated by an alphabetic designation. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring now to FIGS. 1-8, the invention provides a steering column assembly 10 for a vehicle. The steering column assembly 10 includes a steering column 99 having at least one steering column member 12 and a support bracket 14. In the exemplary embodiment of the invention, the steering column member 12 is a lower steering column jacket. The steering column member 12 is disposed for movement along a path 13. The bracket 14 disposed along the path 13. A snap-fit lock 17 is disposed between the steering column member 12 and the bracket 14. The snap-fit lock 17 prevents movement of the steering column member 12 relative to the bracket 14 along the path 13 in response to an impact force acting on the steering column member 12 up to a predetermined level of force. The snap-fit lock 17 disengages in response to an impact force acting on the steering column member 12 greater than said predetermined level of force. A portion of the support bracket 14 in FIG. 1 is broken away to better illustrate features of the lower steering column jacket 12 and the snap-fit lock 17 between the lower steering column jacket 12 and the support bracket 14. In particular, an upper corner of the support bracket 14 extending from an edge 16 to an edge 18 has been removed. The support bracket 14 includes at least one aperture 20 for mounting the support bracket 14 to a vehicle.

The snap-fit lock 17 includes a tab 26 extending from one of the steering column member 12 and the bracket 14 toward the other of the steering column member 12 and the bracket 14. The snap-fit lock 17 also includes a catch or depression 28 defined by the other of the steering column member 12 and the bracket 14 and facing the one of the steering column member 12 and the bracket 14 to receive the tab 26 and limit movement of the steering column member 12 along said path 13. In the exemplary embodiment, the tab 26 extends from the bracket 14 to the steering column member 12 and the depression 28 is defined by the steering column member 12. 5. The tab 26 is integral with the bracket 14 and the depression 28 is integral with the steering column member 12. The tab 26 and the depression 28 are operable to repeatedly engage and disengage with respect to one another. In other words, the snap-fit lock 17 of the exemplary embodiment is not a one-time snap connection which breaks when disengaged.

The tab 26 and the depression 28 engage one another in response to movement of the steering column member 12 relative to the bracket 14. During initial assembly, the lower steering column jacket 12 is moved in a direction 30 until the tab 26 is bent over a leading edge 32 of the lower steering column jacket 12 and snaps into the depression 28. The bracket 14 includes a first guiding portion 23 spaced from the snap-fit lock 17 along the path. The first guiding portion 23 guides movement of the steering column member 12 along at least a portion of the path 13. The first guiding portion 23 includes a ledge 24 or upwardly facing surface 24 that supports the steering column member in a first direction 25 extending transverse to the path 13.

As best shown in FIG. 7, a portion of the lower steering column jacket 12, such as a corner 74, is positioned on the upwardly facing surface 24 and the lower steering column jacket 12 is rotated along an angular path 76. The angular path 76 is substantially centered where the corner 74 engages the upwardly facing surface 24. The steering column member 12 can be rotated along the angular path 76 until a surface 22 of the steering column member 12 is flush or slidably engaging the surface 24. The lower steering column jacket 12 is moved in a direction 30 until the a leading edge 32 of the steering column member 12 contacts an inwardly facing surface 78 of the tab 26 and the tab 26 is bent over the leading edge 32. An edge 80 of the tab 26 is moved upwardly and the tab 26 is rotated along an angular path 82 in response to engagement with the lower steering column jacket 12. As best seen in FIG. 5, the edge 80 slides along a portion 84 of an upwardly facing surface 86 of the lower steering column jacket 12 prior to snapping engagement with the depression 28 (shown in FIG. 4). The tab 26 will then snap into the depression 28. The tab 26 extends into the depression 28 a predetermined distance 34 selected to substantially ensure that the lower steering column jacket 12 is fixed relative to the vehicle during normal vehicle handling. Alternatively, the engagement between the tab 26 and the leading edge 32 could occur while the steering column member 12 is being rotated along the angular path 76. The lower steering column jacket 12 is engageable with the support bracket 14 to substantially fix the position of the lower steering column jacket 12 with respect to the vehicle during normal vehicle handling.

The bracket 14 of the exemplary embodiment also includes a second guiding portion 35 spaced from the snap-fit lock 17 along the path 13. The snap-fit lock 17 is disposed between the first and second guiding portions 23, 35 along the path 13. The second guiding portion 35 guides movement of the steering column member 12 in a second direction 27 transverse to the first direction 25. The second guiding portion 35 includes a window 36 open to the path 13. The lower steering column jacket 12 is moved into the window 36 during engagement between the tab 26 and the depression 28. The window 36 is also defined by an edge 80 of the tab 26.

In an impact situation, the driver of the vehicle may be propelled against the steering wheel and cause the steering column assembly 10 to collapse and the steering column member 12 to move in the direction 30 along the path 13. The lower steering column jacket 12 can be urged in the direction 30 so that the leading edge 32 will move further into the window 36. During this movement, a trailing edge 38 of the depression 28 will act against the tab 26 in a cam/cam-follower relationship and the tab 26 will be disengaged with respect to the depression 28. As best seen in FIG. 6, the edge 80 of the tab 26 slides along a second portion 88 of the upwardly facing surface 86 during collapsing movement of the lower steering column jacket 12 relative to the support bracket 14.

The structure of the lower steering column jacket 12 and the support bracket 14 can be modified to enhance collapsing characteristics of the steering column. For example, the window 36 is defined by two transverse edges 40-42. The lower steering column jacket 12 of the exemplary embodiment of the invention includes a first transverse rectangular portion 44, a second transverse rectangular portion 46, and an intermediate portion of increasing width extending from the first portion 44 to the second portion 46. The first rectangular portion 44 is sized to pass through the window 36 and the second rectangular portion 46 is sized larger than the window 36. Movement of the lower steering column jacket 12 through the window 36 during an impact event will extend from the leading edge 32 to a predetermined longitudinal position along the intermediate portion 48. This distance can be selected based upon the energy absorbing characteristics of an energy absorbing member in the column (not shown). For example, the distance that the lower steering column jacket 12 extends through the window 36 can correspond to the length of an energy absorbing strap that is bent around an anvil in the steering column.

The steering column assembly 10 also includes a second bracket 15 mountable on support structure of a vehicle in spaced relation to the first bracket 14 to secure the steering column 99 against movement along the path 13 in response to application of a force on the steering column 99 below a threshold force and to release the steering column 99 in response to a force exceeding the threshold force wherein the steering column 99 moves along the path 13a in response to the force exceeding the threshold force. The threshold force required to separate the second bracket 15 from the vehicle support structure typically greater than the impact force required to urge the tab 26 out of the depression 28.

Referring now to FIGS. 9-12, the invention also provides steering column assembly 72 having a bearing 54 for supporting a steering shaft 52 extending through a lower steering column jacket 12a. The steering shaft 52 is disposed, at least in part, for rotation within the steering column member 12a. The steering column member 12a has a first end defining a shoulder 66, an aperture 67, and a transverse slot 70 axially spaced from the shoulder 66. The steering shaft 52 extends through the aperture 67. The bearing 54 is adjacent to the shoulder 66 and includes an inner race 56 encircling the steering shaft 52 and an outer race 58 encircled by a surface 60 of the lower steering column jacket 12a. In the exemplary embodiment of the invention, the bearing 54 is pressed into the lower steering column jacket 12a at the surface 60. A snap ring 62 enhances the strength of the bearing 54 by preventing longitudinal movement of the inner race 56 in a direction 64. The shoulder 66 prevents movement of the outer race 58 in a direction 64.

The invention also provides a wire retainer 68 for preventing the bearing 54 from releasing with respect to the surface 60 in a crash condition. The wire retainer 68 is staple-shaped and is received in a correspondingly configured slot 70 defined by the lower steering column jacket 12a. The retainer 68 also substantially prevents the bearing 54 from backing out of the surface 60 during normal vehicle handling. In the exemplary embodiment of the invention, the shoulder 66 and the transverse slot 70 are integral with one another.

Figure 13:
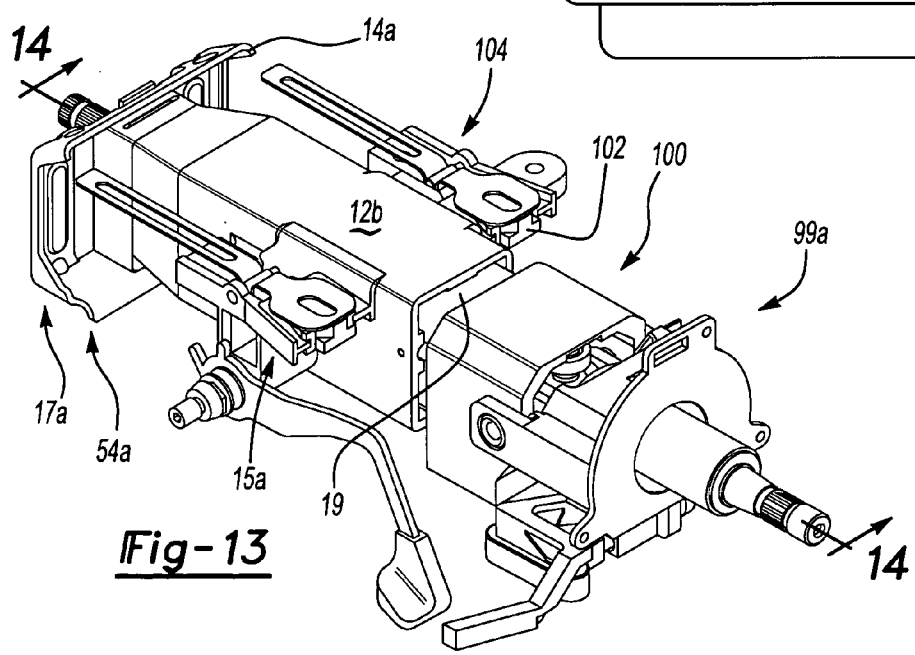
FIG. 13 is a perspective view of a steering column assembly including a snap-on lower bracket and bearing support according to an embodiment of the invention.
Figure 14:
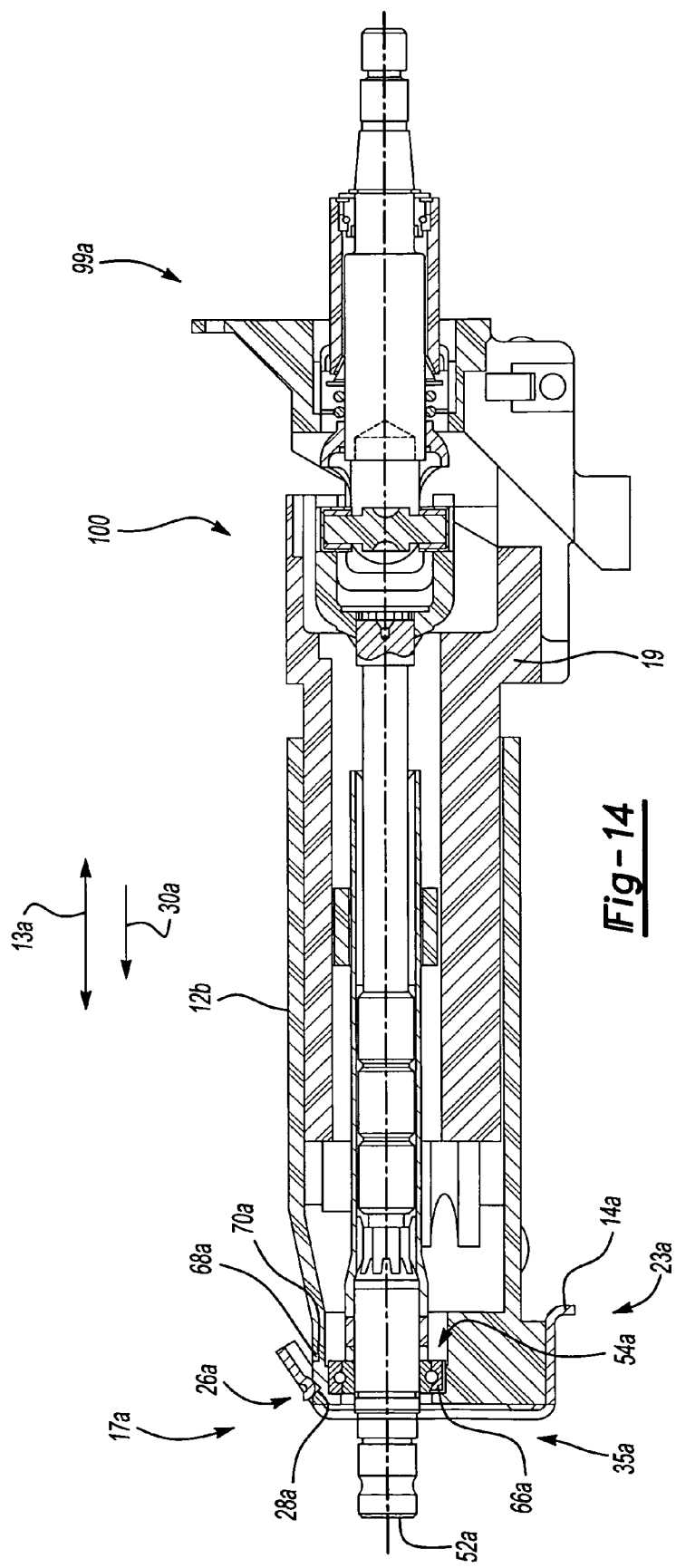
FIG. 14 is a cross-sectional view taken along section lines 14-14 in FIG. 13.

Referring now to FIGS. 13 and 14, in an alternative embodiment of the invention, a steering column assembly 100 includes a steering column 99a having at least one steering column member 12b disposed for movement along a path 13a. The steering column assembly 100 also includes a first bracket 14a disposed along the path 13, 13a and mountable on a support structure of a vehicle adjacent a lower end region of the steering column 99a and providing guiding support to the steering column 99a during the movement along the path 13a. The steering column assembly 100 also includes a snap-fit lock 17a disposed between the steering column member 12b and the first bracket 14a preventing movement of the steering column member 12b relative to the first bracket 14a along the path 13a in response to an impact force acting on the steering column member 12b up to a predetermined level of force. The snap-fit lock 17a disengages in response to an impact force acting on the steering column member 12b greater than the predetermined level of force. The snap-fit lock 17a a includes a depression 28a and a tab 26a. The tab 26a is received in the depression 28a in a snap-fit relationship and maintains the position of the lower steering column jacket 12b relative to the vehicle during normal vehicle handling.

The steering column assembly 100 also includes a steering shaft 52a. The steering column assembly 100 also includes a second steering column member 19 engaged with the steering column member 12b for sliding or telescopic movement and encircling at least part of the steering shaft 52a.

The steering column assembly 100 also includes a second bracket 15a mountable on support structure of a vehicle in spaced relation to the first bracket 14a to secure the steering column 99a against movement along the path 13a in response to application of a force on the steering column 99a below a threshold force and to release the steering column 99a in response to a force exceeding the threshold force wherein the steering column 99a moves along the path 13a in response to the force exceeding the threshold force. The threshold force required to separate the second bracket 15 from the vehicle support structure typically greater than the impact force required to urge the tab 26a out of the depression 28a. A release capsule 102 is associated with the second bracket 15a and releases in response to the force greater than the threshold force. An energy absorbing device 104 responsive to movement of the steering column along the path 13, 13a is also associated with the second bracket 15a.

The steering column assembly 100 also includes a bearing 54a. The bearing 54a is disposed adjacent a shoulder 66a, limiting movement of the bearing 54a relative to the lower steering column jacket 12b. A wire retainer 68a is received in a slot 70a defined by the lower steering column jacket 12b. The shoulder 66a and the wire retainer 68a substantially fix the position of the bearing 54a relative to the lower steering column jacket 12b.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An steering column assembly (10, 72, 100) comprising:
    a steering column member (12, 12b) disposed for movement along a path (13, 13a);
    a bracket (14, 14a) disposed along said path (13, 13a);
    a snap-fit lock (17, 17a) disposed between said steering column member (12, 12b) and said bracket (14, 14a) and preventing movement of said steering column member (12, 12b) relative to said bracket (14, 14a) along said path (13, 13a) in response to an impact force acting on said steering column member (12, 12b) up to a predetermined level of force and wherein snap-fit lock (17, 17a) disengages in response to an impact force acting on said steering column member (12, 12b) greater than said predetermined level of force.

2. The steering column assembly (10, 72, 100) of claim 1 further comprising:
    a steering shaft (52, 52a) disposed, at least in part, for rotation within said steering column member (12, 12a, 12b).

3. The steering column assembly (10, 72, 100) of claim 2 further comprising:
    a second steering column member (19) engaged with said steering column member (12, 12a, 12b) for sliding movement and encircling at least part of said steering shaft (52, 52a).

4. The steering column assembly (10, 72, 100) of claim 1 wherein said snap-fit lock (17, 17a) further comprises:
    a tab (26, 26a) extending from one of said steering column member (12, 12a, 12b) and said bracket (14, 14a) toward the other of said steering column member (12, 12a, 12b) and said bracket (14, 14a); and
    a depression (28, 28a) defined by said other of said steering column member (12, 12a, 12b) and said bracket (14, 14a) and facing said one of said steering column member (12, 12a, 12b) and said bracket (14, 14a) to receive said tab (26, 26a) to limit movement of said steering column member (12, 12a, 12b) along said path (13, 13a).

5. The steering column assembly (10, 72, 100) of claim 4 wherein said tab (26, 26a) and said depression (28, 28a) are operable to repeatedly engage and disengage with respect to one another.

6. The steering column assembly (10, 100) of claim 4 wherein said tab (26, 26a) and said depression (28, 28a) engage one another in response to movement of said steering column member (12, 12b) relative to said bracket (14, 14a).

7. The steering column assembly (10, 100) of claim 4 wherein said tab (26, 26a) is integral with said bracket (14, 14a) and said depression (28, 28a) is integral with said steering column member (12, 12b).

8. The steering column assembly (10, 100) of claim 1 wherein said bracket (14, 14a) further comprises a first guiding portion (23, 23a) spaced from said snap-fit lock (17, 17a) along said path (13, 13a).

9. The steering column assembly (10, 100) of claim 8 wherein said first guiding portion (23, 23a) guides movement of said steering column member (12, 12b) along at least a portion of said path (13, 13a).

10. The steering column assembly (10, 100) of claim 9 wherein said bracket (14, 14a) further comprises a second guiding portion (35, 35a) spaced from said snap-fit lock (17, 17a) along said path (13, 13a).

11. The steering column assembly (10, 100) of claim 10 wherein said snap-fit lock (17, 17a) is disposed between said first and second guiding portions (23, 23a, 35, 35a) along said path (13, 13a).

12. The steering column assembly (10, 100) of claim 11 wherein said first and second guiding portions (23, 23a, 35, 35a) respectively guide movement in transverse directions (25, 27) with respect to one another.

13. The steering column assembly (10, 100) of claim 12 wherein said second guiding portion (35, 35a) includes a window (36) open to said path (13, 13a) and said first guiding portion (23, 23a) includes a ledge (24) extending from said window (36), wherein said steering column member (12, 12b) being supported on said ledge (24) when said snap-fit lock (17, 17a) is engaged.

14. An steering column assembly (72, 100) comprising:
a steering column member (12a) having a first end defining a shoulder (66, 66a) and an aperture (67) and a transverse slot (70) axially spaced from said shoulder (66, 66a);
a steering shaft (52, 52a) extending through said aperture (67);
a bearing (54, 54a) encircling said steering shaft (52, 52a) adjacent to said shoulder (66, 66a); and
a retainer (68, 68a) received in said slot (70) wherein said retainer (68, 68a) and said shoulder (66, 66a) cooperate to prevent said bearing (54, 54a) from axially moving relative to said steering shaft (52, 52a).

15. The steering column assembly (72, 100) of claim 14 wherein said retainer (68, 68a) is a formed from wire.

16. The steering column assembly (72, 100) of claim 14 wherein said shoulder (66, 66a) and said transverse slot (70) are integral with one another.

17. A method relating to a steering column assembly (10, 72, 100) comprising the steps of:
first disposing a steering column member (12, 12b) for movement along a path (13, 13a);
second disposing a bracket (14, 14a) along the path (13, 13a);
preventing movement of the steering column member (12, 12b) relative to the bracket (14, 14a) along the path (13, 13a) in response to an impact force acting on the steering column member (12, 12b) up to a predetermined level of force with a snap-fit lock (17, 17a) disposed between the steering column member (12, 12b) and the bracket (14, 14a) wherein the snap-fit lock (17, 17a) disengages in response to an impact force acting on said steering column member (12, 12b) greater than said predetermined level of force.

18. The method of claim 17 wherein said first disposing step includes the steps of:
supporting an end of the steering column member (12, 12b) on the bracket (14, 14a); and
moving the steering column member (12, 12b) toward the snap-fit lock (17, 17a) during the supporting step.

19. The method of claim 18 wherein said preventing step includes the steps of:
extending a tab (26, 26a) from one of the steering column member (12, 12b) and the bracket (14, 14a) toward the other of the steering column and the bracket (14, 14a);
defining a depression (28, 28a) in the other of the steering column and the bracket (14, 14a) facing the one of the steering column member (12, 12b) and the bracket (14, 14a).

20. The method of claim 19 wherein said moving step is further defined as:
sliding the steering column member (12, 12b) relative to the bracket (14, 14a) along the path (13, 13a) until the tab (26, 26a) is received in the depression (28, 28a) to limit movement of said steering column along said path (13, 13a).

21. A steering column assembly (10, 100) comprising:
a steering column (99, 99a) having at least one steering column member (12, 12b) disposed for movement along a path (13, 13a);
a first bracket (14, 14a) disposed along said path (13, 13a) and mountable on a support structure of a vehicle adjacent a lower end region of said steering column (99, 99a) and providing guiding support to said steering column (99, 99a) during said movement along said path (13, 13a);
a snap-fit lock (17, 17a) disposed between said steering column member (12, 12b) and said first bracket (14, 14a) and preventing movement of said steering column member (12, 12b) relative to said first bracket (14, 14a) along said path (13, 13a) in response to an impact force acting on said steering column member (12, 12b) up to a predetermined level of force and wherein said snap-fit lock (17, 17a) disengages in response to an impact force acting on said steering column member (12, 12b) greater than said predetermined level of force; and
a second bracket (15, 15a) mountable on support structure of a vehicle in spaced relation to said first bracket (14, 14a,) to secure said steering column (99, 99a) against movement along said path (13, 13a) in response to application of a force on said steering column (99, 99a) below a threshold force and to release said steering column (99, 99a) in response to a force exceeding the threshold force wherein said steering column (99, 99a) moves along said path (13, 13a) in response to the force exceeding the threshold force.

22. The steering column assembly (10, 100) according to claim 21 wherein said first bracket (14, 14a,) encircles said steering column (99, 99a).

23. The steering column assembly (10, 100) according to claim 22 wherein said snap-fit lock (17, 17a) includes a spring tab (26, 26a) carried on one of said steering column member (12, 12b) and said first bracket (14, 14a) and a catch (28) carried on the other of said steering column member (12, 12b) and said first bracket (14, 14a).

24. The steering column assembly (10, 100) according to claim 23 wherein said spring tab (26, 26a) is carried on said first bracket (14, 14a).

25. The steering column assembly (10, 100) according to claim 24 wherein said first bracket (14, 14a) includes a window (36) through which said steering column (99, 99a) extends.

26. The steering column assembly (10, 100) according to claim 25 wherein said spring tab (26, 26a) projects into said window (36).

27. The steering column assembly (100) according to claim 21 wherein said second bracket (15, 15a) includes at least one release capsule (102).

28. The steering column assembly (100) according to claim 21 including an energy absorbing device (104) responsive to movement of said steering column along said path (13, 13a).

* * * * *